(12) United States Patent
Noguchi et al.

(10) Patent No.: US 6,762,592 B2
(45) Date of Patent: Jul. 13, 2004

(54) EXCITATION CONTROLLER FOR SYNCHRONOUS MACHINE

(75) Inventors: Shinya Noguchi, Tokyo (JP); Seiichi Tanaka, Tokyo (JP); Masaru Shimomura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 94 days.

(21) Appl. No.: 10/126,688

(22) Filed: Apr. 22, 2002

(65) Prior Publication Data

US 2003/0102848 A1 Jun. 5, 2003

(30) Foreign Application Priority Data

Nov. 30, 2001 (JP) ........................................ 2001-366369

(51) Int. Cl.⁷ .......................... H02H 7/06; H02P 11/00; H02P 9/00; H02P 9/10
(52) U.S. Cl. ........................................ 322/28; 322/59
(58) Field of Search ............................ 322/24, 25, 27, 322/28, 59

(56) References Cited

U.S. PATENT DOCUMENTS

| | | | | |
|---|---|---|---|---|
| 4,245,182 A | * | 1/1981 | Aotsu et al. ................... 322/20 |
| 4,350,947 A | * | 9/1982 | Uenosono et al. ............. 322/17 |
| 4,639,657 A | * | 1/1987 | Frierdich ...................... 322/59 |
| 4,714,869 A | * | 12/1987 | Onitsuka ...................... 322/20 |
| 4,812,729 A | * | 3/1989 | Ito et al. ...................... 318/732 |
| 5,045,779 A | * | 9/1991 | Herrick et al. ............... 324/772 |
| 5,440,222 A | * | 8/1995 | Tanaka et al. ................. 322/25 |
| 5,604,420 A | * | 2/1997 | Nambu ........................ 322/19 |
| 5,977,731 A | * | 11/1999 | Xia et al. .................... 318/147 |
| 6,265,852 B1 | * | 7/2001 | Kitamura et al. ............. 322/59 |
| 6,555,929 B1 | * | 4/2003 | Eaton et al. ............... 290/40 B |

FOREIGN PATENT DOCUMENTS

JP          2000-308397          11/2000

\* cited by examiner

*Primary Examiner*—Nicholas Ponomarenko
*Assistant Examiner*—Julio C. Gonzalez
(74) *Attorney, Agent, or Firm*—Leydig, Voit & Mayer, Ltd.

(57) ABSTRACT

An excitation controller for a synchronous machine includes a voltage detector for detecting an output terminal voltage of the synchronous machine connected to a transmission system through a transformer; a current detector for detecting a current outputted by the synchronous machine; a module type high side voltage control apparatus for operating arithmetically on a reactive current value on the basis of output from the voltage detector and the current detector, operating arithmetically on a high side voltage value from the reactive current value thus arithmetically operated on and a reactance of the transformer, and outputting a correction signal based on a deviation between the high side voltage value thus arithmetically operated on and a voltage setting value; an automatic voltage regulator, having a voltage setter, for outputting a command which is obtained by adding the correction signal to a voltage setting value provided by the voltage setter; and an exciter for carrying out field control of the synchronous machine on the basis of a command issued from the automatic voltage regulator.

6 Claims, 7 Drawing Sheets

EXCITATION CONTROLLER FOR SYNCHRONOUS MACHINE

This application is based on Application No. 2001-366369, filed in Japan on Nov. 30, 2001, the contents of which are hereby incorporated by reference.

BACKGROUND OF THE INVENTION

1. Field of the Invention

The present invention relates in general to an excitation controller for a synchronous machine. More particularly, the invention relates to an excitation controller for a synchronous machine which contributes to the enhancement of stabilizing a voltage in an electric power system.

2. Description of the Related Art

A conventional excitation controller for a synchronous machine described in U.S. Pat. No. 6,265,852 B1 has a high side voltage control (hereinafter, referred to as "HSVC" for short, when applicable) function of controlling a high side voltage of a main transformer in such a way that it becomes equal to a control reference value. This HSVC function is a function which is added to an automatic voltage regulator (hereinafter, referred to as "AVR" for short, when applicable) in the form of software.

Therefore, when it is intended that the HSVC function is added to existing control equipment, there arises the problem that since it is necessary to replace the overall AVR with a desired one, this results in an increase in cost.

SUMMARY OF THE INVENTION

In the light of the foregoing, the present invention has been made in order to solve the above-mentioned problem associated with the prior art, and it is therefore an object of the present invention to obtain an excitation controller for a synchronous machine in which the HSVC function can be obtained without exchanging an existing AVR.

An excitation controller for a synchronous machine according to the present invention includes: a voltage detector for detecting an output terminal voltage of the synchronous machine connected to a transmission system through a transformer; a current detector for detecting a current outputted by the synchronous machine; a module type HSVC (High Side Voltage Control) apparatus for operating arithmetically a reactive power on the basis of output signals from the voltage detector and the current detector, operating arithmetically a reactive current value from the generator terminal voltage and the reactive power, operating arithmetically a high side voltage value from the reactive current value thus arithmetically operated and a reactance of the transformer and outputting a correction signal based on a deviation between the high side voltage value thus arithmetically operated and a voltage setting value; an automatic voltage regulator, having a voltage setter, for outputting a command which is obtained by adding the correction signal to a voltage setting value provided by the voltage setter; and an exciter for carrying out field control of said synchronous machine on the basis of the command issued from the automatic voltage regulator.

Also, the module type HSVC apparatus includes an HMI (Human Machine Interface) for carrying out setting of a reference voltage, and setting and display of control logic.

Also, the module type HSVC apparatus includes a connection unit having a communication function for connecting the HMI to a network.

Also, the module type HSVC apparatus has an input unit for inputting therethrough a voltage setting value from the automatic voltage regulator and outputs a correction signal based on a deviation between the inputted voltage setting value and the arithmetically operated high side voltage value.

Also, the synchronous machines are connected in parallel with one another to the transmission system through the transformer, the voltage detector, the current detector, the module type HSVC apparatus, the automatic voltage regulator, and the exciter are provided for each of the synchronous machines, and each of the module type HSVC apparatuses carries out control for suppressing a cross current on the basis of an input of a reactive power from the other module type HSVC apparatus.

Further, the module type HSVC apparatus includes an analog output unit for outputting therethrough an arithmetic operation result.

BRIEF DESCRIPTION OF THE DRAWINGS

The above and other objects as well as advantages of the present invention will become clear by the following description of the preferred embodiments of the present invention with reference to the accompanying drawings, wherein.

DETAILED DESCRIPTION OF THE PREFERRED EMBODIMENTS

The preferred embodiments of the present invention will hereinafter be described in detail with reference to the accompanying drawings.

Embodiment 1

Figure 1:
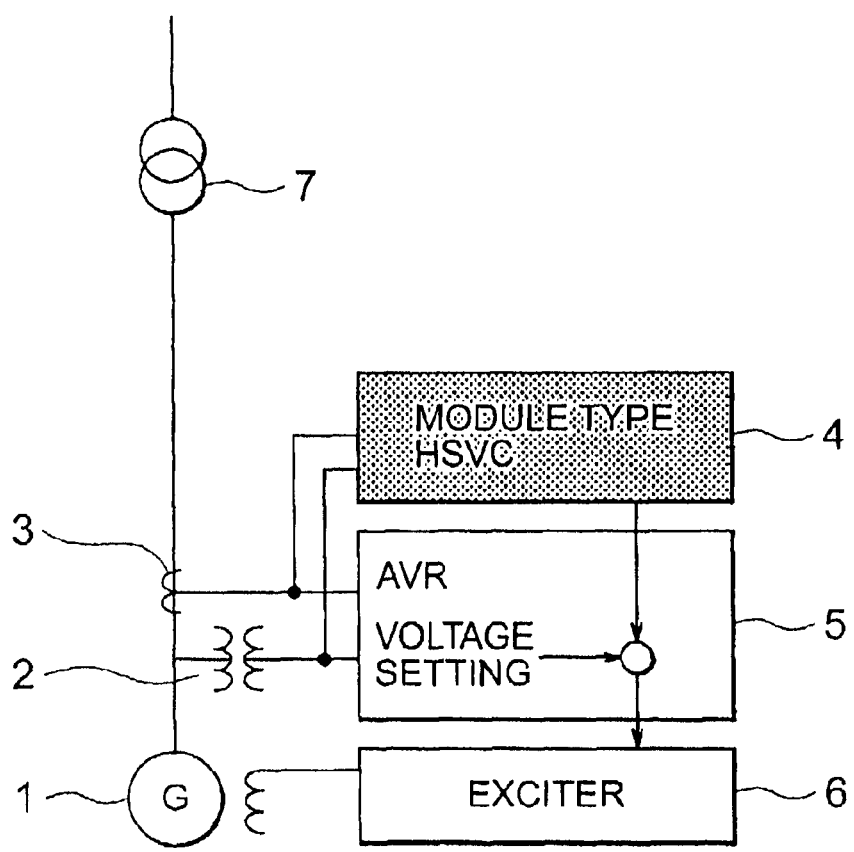
FIG. 1 is a block diagram, partly in circuit diagram, showing a configuration of an overall excitation controller for a synchronous machine according to Embodiment 1 of the present invention.

FIG. 1 is a block diagram showing a configuration of an overall excitation controller for a synchronous machine according to Embodiment 1 of the present invention. The excitation controller for a synchronous machine shown in FIG. 1 is additionally provided with an excitation controller 4 which is employed in order to add an HSVC function (hereinafter, referred to as "module type HSVC apparatus" for short, when applicable) in addition to the configuration including a potential transformer (hereinafter, referred to as "PT" for short, when applicable) 2 for detecting an output voltage of a synchronous machine 1, a current transformer (hereinafter, referred to as "CT" for short, when applicable)

3 for detecting an output current of the synchronous machine 1, an existing AVR 5 for adjusting an voltage of a generator on the basis of outputs of the PT 2 and the CT 3, and an exciter 6 for controlling a field of the synchronous machine 1 on the basis of a command issued from the AVR 5.

The module type HSVC apparatus 4 is adapted to add a correction signal, which is used to provide the HSVC function, to a voltage setting value of the existing AVR 5 to control the exciter 6, and also is adapted to carry out the control in such a way that a high side voltage of a main transformer 7 becomes equal to a reference voltage setting value. That is, the module type HSVC apparatus 4 arithmetically operates a terminal output, an effective power and a reactive power of a generator on the basis of the outputs from the PT 2 and the CT 3, arithmetically operates a reactive current value, which the synchronous machine 1 outputs, from the terminal voltage and the reactive power of the generator, arithmetically operates a high side voltage value from the reactive current value thus arithmetically operated and a reactance of the main transformer 7, and then outputs a correction signal in correspondence to a deviation between the high side voltage thus arithmetically operated and a reference voltage setting value.

Figure 2:
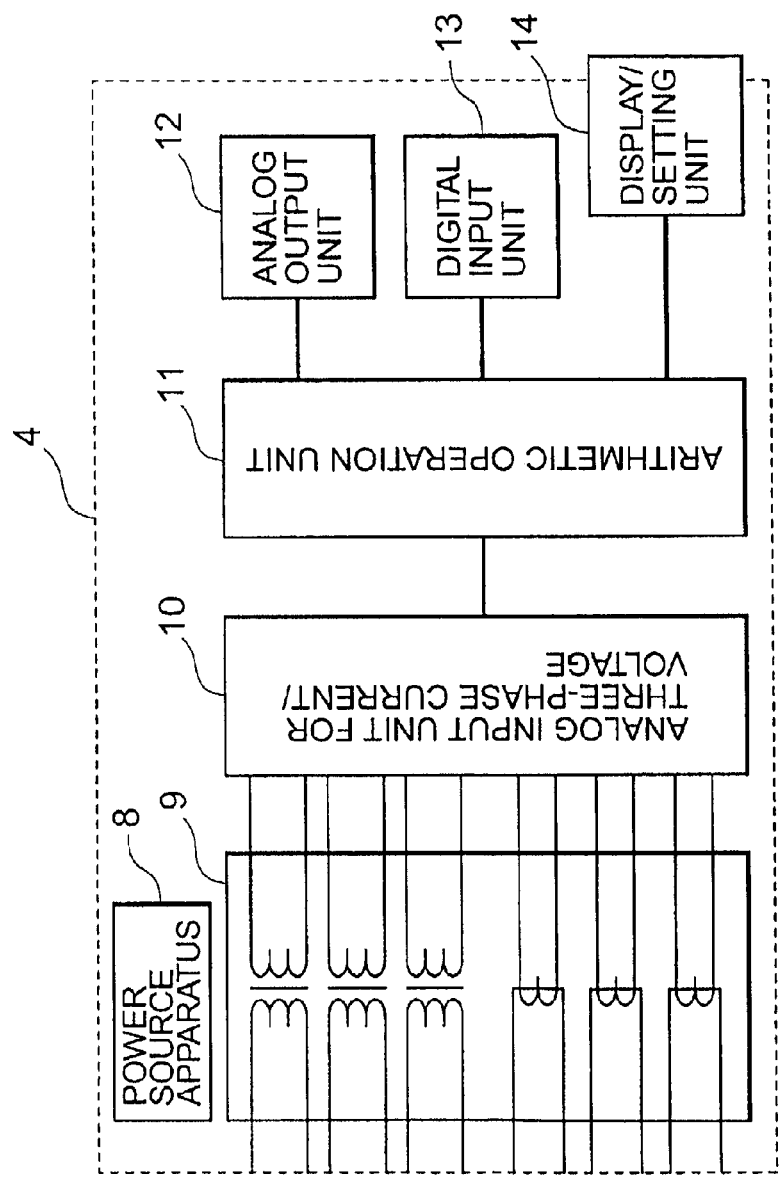
FIG. 2 is a block diagram showing an internal configuration of a module type HSVC according to Embodiment 1 of the present invention.

Here, the module type HSVC apparatus 4, as shown in FIG. 2, in a module case, includes: a power source circuit 8 for supplying an electric power for the module type HSVC apparatus 4; an auxiliary potential transformer/current transformer (hereinafter, referred to as "auxiliary PT/CT" for short, when applicable) 9; an analog input unit 10 for a three-phase current/voltage for reading out a terminal voltage and a current of the synchronous machine 1 through the auxiliary PT/CT 9; an arithmetic operation unit 11 for operating arithmetically a correction signal which is used to realize the HSVC function and to control the overall module on the basis of an output signal from the analog input unit 10 for a three-phase current/voltage; an analog output unit 12 for outputting the correction signal, which has been arithmetically operated in the arithmetic operation unit 11, to the existing AVR 5; a digital input unit 13 for providing a digital input signal which is used to switch the state of the function of the module type HSVC apparatus 4 over to effectiveness/reactiveness; and a display/setting unit 14 serving as a human machine interface (HMI) for carrying out the setting of a reference voltage, and the setting and the display of control logic.

Next, the description will hereinbelow be given with respect to the operation of the excitation controller for a synchronous machine shown in FIG. 1. In the module type HSVC apparatus 4, the analog input unit 10 for a three-phase current/voltage receives as its inputs detection signals from the PT 2 and the CT 3 through the auxiliary PT/CT 9 to measure a terminal current and a terminal voltage of the synchronous machine 1. The arithmetic operation unit 11 arithmetically operates a generator terminal voltage, an effective power and a reactive power on the basis of an output signal from the analog input unit 10 for a three-phase current/voltage, arithmetically operates a reactive current from the generator terminal voltage and the reactive power which have been arithmetically operated, and arithmetically operates a high side voltage value from those arithmetically operated values and the known reactance of the main transformer 7. Then, the arithmetic operation unit 11 outputs a correction signal, which has been obtained on the basis of a deviation between the high side voltage value thus arithmetically operated and the setting value thereof, to the AVR 5 through the analog output unit 12. Thus, the module type HSVC apparatus 4 realizes the HSVC function. It should be noted that the confirmation and the change of the setting value for the arithmetic operation are both carried out through the display/setting unit 14 mounted to the module, and the use and the omission of the function are both carried out through the digital input unit 13.

Therefore, according to the above-mentioned Embodiment 1, it is possible to add the HSVC function to the controller without exchanging an existing AVR.

Embodiment 2

Figure 3:
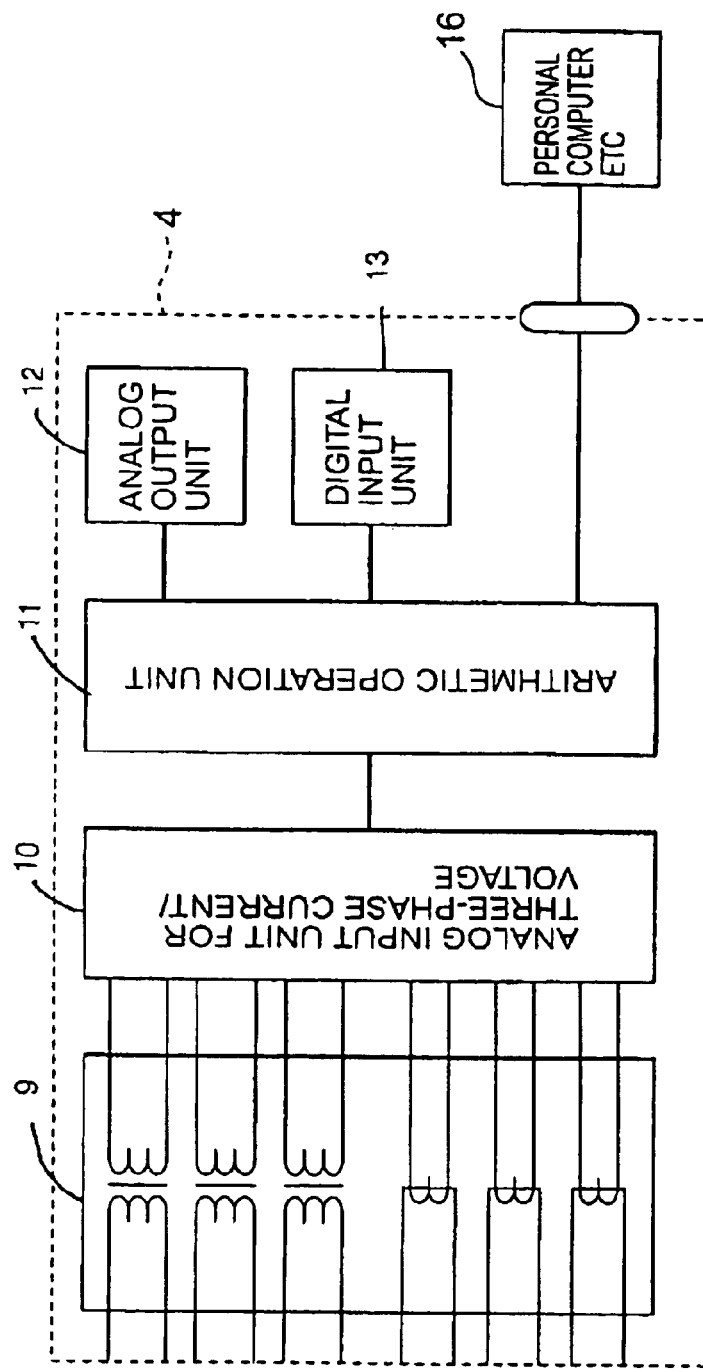
FIG. 3 is a block diagram showing an internal configuration of a module type HSVC according to Embodiment 2 of the present invention.

While in the above-mentioned Embodiment 1, the confirmation and the change of the setting value are carried out through the display/setting unit 14 mounted to the module, alternatively, as shown in FIG. 3, instead of display/setting unit 14, a tool 16 such as a personal computer may also be directly connected to the arithmetic operation unit 11 in order to realize the display function and the setting function using the tool 16.

Embodiment 3

Figure 4:
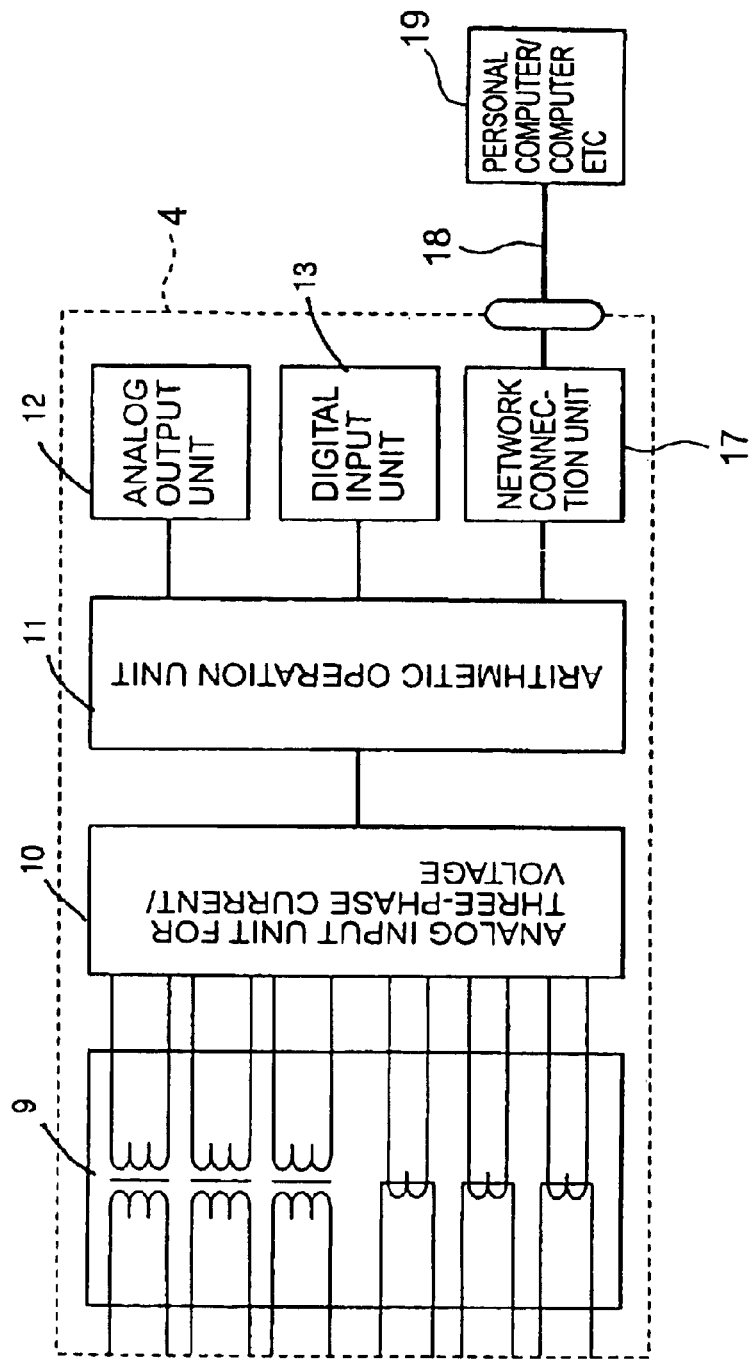
FIG. 4 is a block diagram showing an internal configuration of a module type HSVC according to Embodiment 3 of the present invention.

While in the above-mentioned Embodiment 2, the display function and the setting function are realized by the tool which can be directly connected to the arithmetic operation unit 11, alternatively, as shown in FIG. 4, a network connection unit 17 having a communication function to establish a connection to a network 18 may also be connected to the arithmetic operation unit 11 in order to realize the display function and the setting function of the arithmetic operation unit 11, from a distant place, by a tool 19 such as a personal computer connected to the network 18.

Embodiment 4

Figure 5:
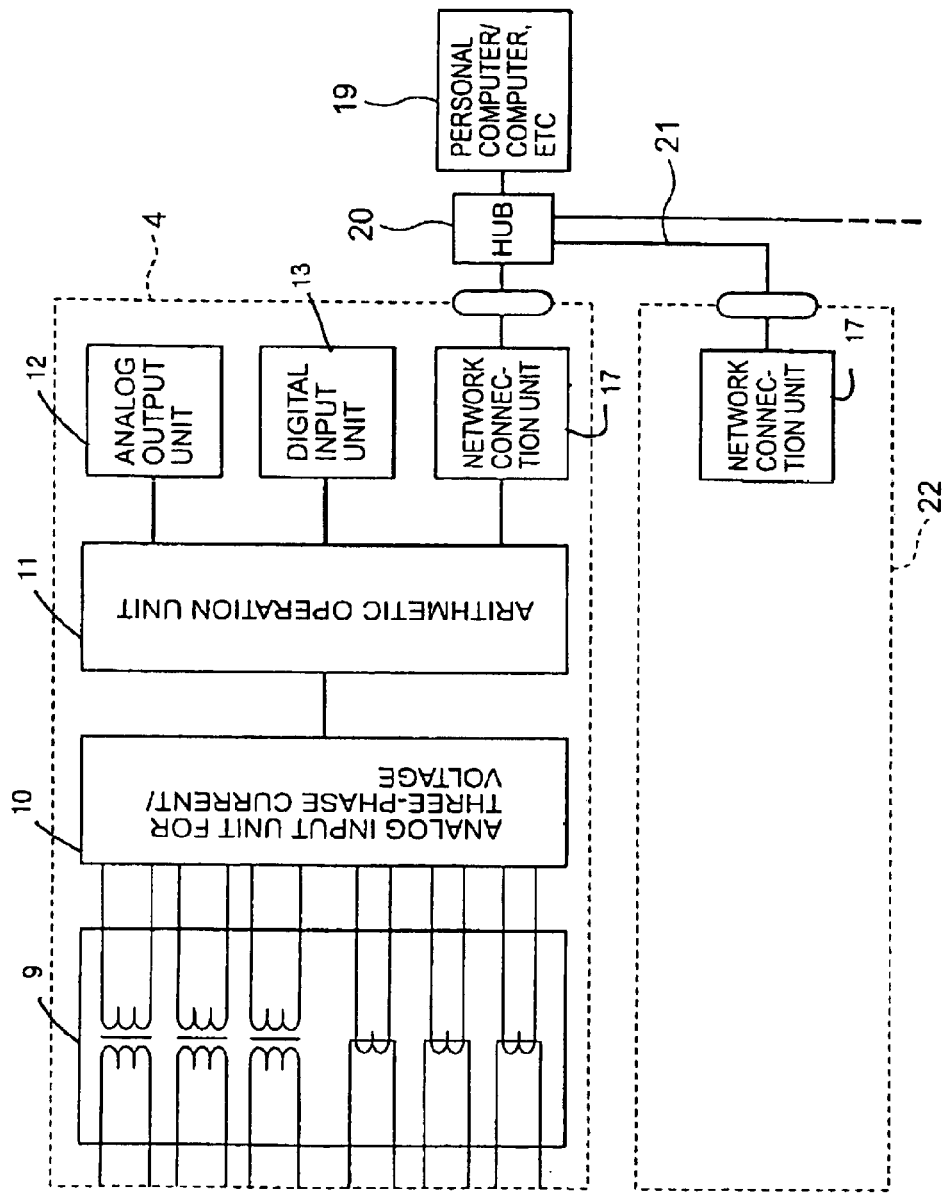
FIG. 5 is a block diagram showing an internal configuration of a module type HSVC according to Embodiment 4 of the present invention.

While in the above-mentioned Embodiment 3, the display function and the setting function via the network are realized, it is conceivable that this module type HSVC apparatus 4 which has been developed is mounted for each of a plurality of connected synchronous machines. At this time, as shown in FIG. 5, a tool 19 such as a single personal computer may also be connected to a plurality of module type HSVC apparatuses 4, 22, etc., through a HUB 20 or the like and a network 21 in order to realize the display function and the setting function at the same time.

Embodiment 5

Figure 6:
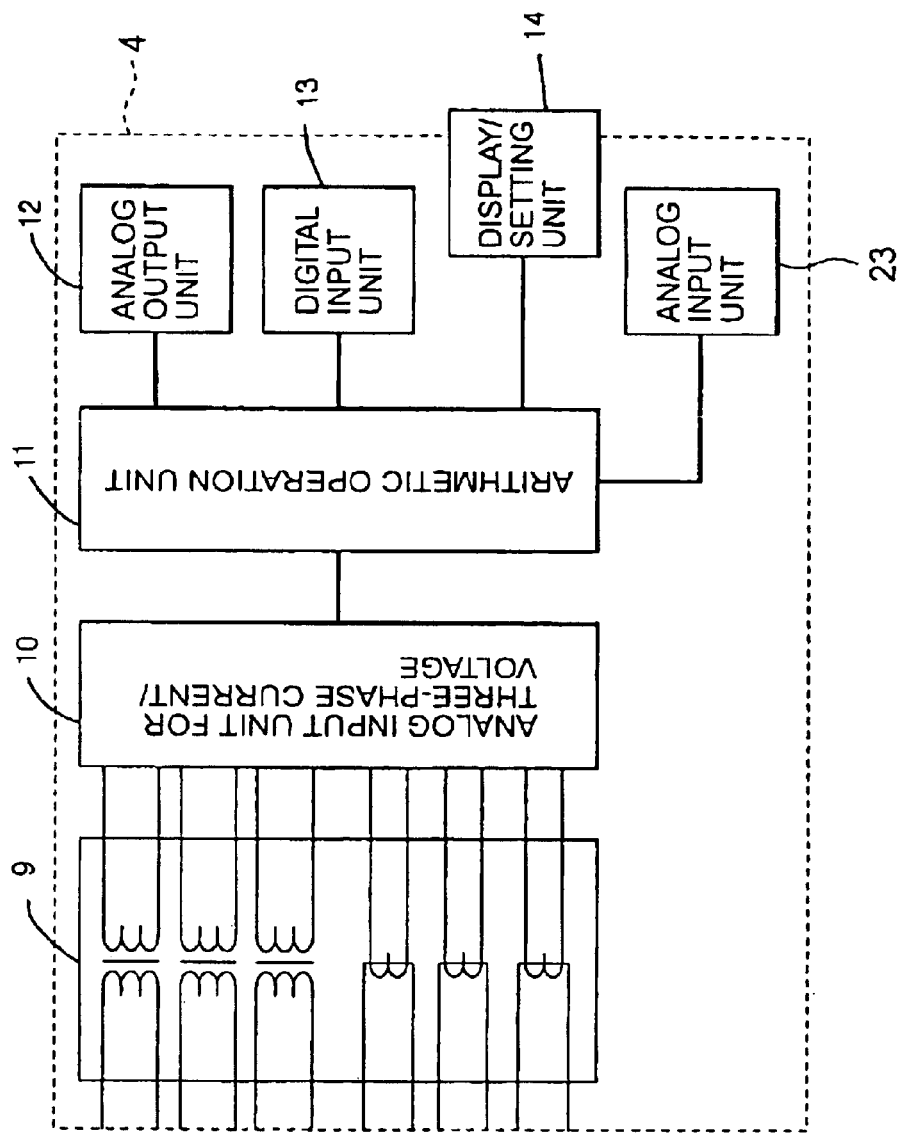
FIG. 6 is a block diagram showing an internal configuration of a module type HSVC according to Embodiment 5 of the present invention.

While in the above-mentioned Embodiment 1, the voltage setting value of the existing AVR 5 is inputted as the setting value from the display/setting unit 14 of the module type HSVC apparatus 4, alternatively, as shown in FIG. 6, a analog input unit 23 may also be added to read out the voltage setting value of the existing AVR in order to set automatically the voltage setting value of the existing AVR.

Embodiment 6

Figure 7:
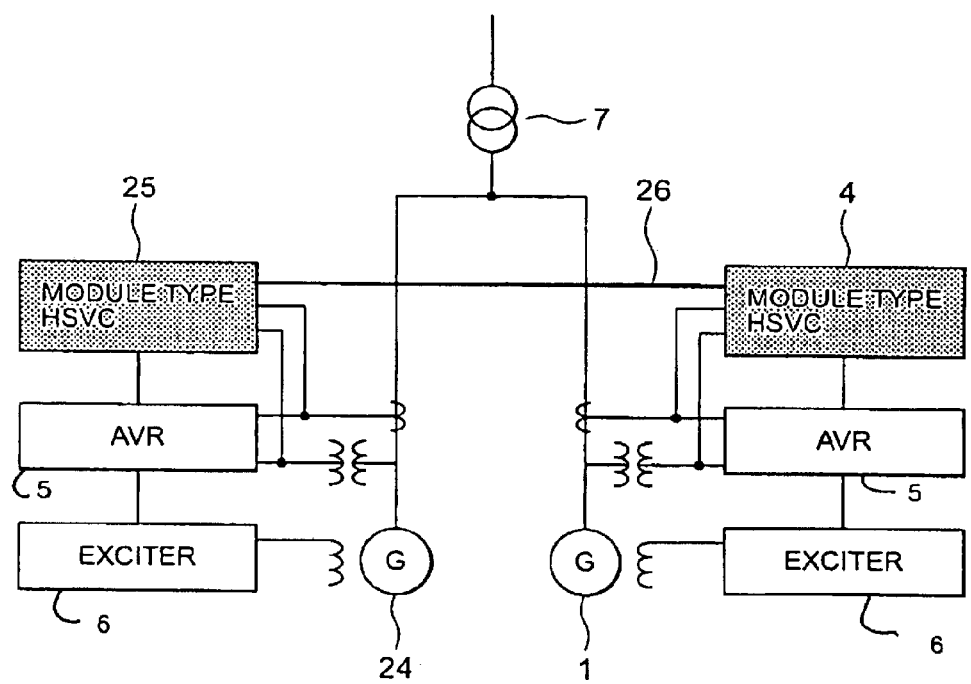
FIG. 7 is a block diagram, partly in circuit diagram, showing a configuration of an overall excitation controller for a synchronous machine according to Embodiment 6 of the present invention.

FIG. 7 is a block diagram, partly in circuit diagram, showing the state in which two synchronous machines 1 and 24 are operated in parallel with each other. A module type HSVC apparatus 25, similarly to the synchronous machine 1, is mounted to the synchronous machine 24 as well. At this time, it is conceivable that when the control is carried out with the module type HSVC apparatuses 4 and 25, respectively, the outputs thereof become unbalanced so that a cross current is caused to flow. Therefore, the output reactive power signals of the synchronous machines 1 and 24 are outputted from the analog output units 12 to be read out by the analog input units 23, respectively, through a signal line 26 shown in FIG. 7, whereby the control of suppressing the cross current can be carried out. For this reason, the suppression of the cross current may be implemented with the configuration shown in FIG. 6.

Embodiment 7

Since the module type HSVC apparatus 4 of the invention functions integrally, there is the case where a value inside thereof is to be measured on request. For this reason, an output signal of the analog output unit 12 also may be outputted to a check pin (not shown) mounted to the module case to measure the internal arithmetic operation value using a measuring instrument, such as an oscilloscope.

It should be noted that Embodiments 1 to 7 described above may be combined with each other to be used. Therefore, the apparatuses may be available in which the apparatuses of Embodiments 1 to 7 are simultaneously used.

As set forth hereinabove, according to the present invention, an excitation controller for a synchronous machine includes: a voltage detector for detecting an output terminal voltage of a synchronous machine connected to a transmission system through a transformer; a current detector for detecting a current outputted by the synchronous machine; a module type HSVC (High Side Voltage Control) apparatus for operating arithmetically a reactive power on the basis of output signals from the voltage detector and the current detector, operating arithmetically a reactive current value from the generator terminal voltage and the reactive power, operating arithmetically a high side voltage value from the reactive current value thus arithmetically operated and a reactance of the transformer and outputting a correction signal based on a deviation between the high side voltage value thus arithmetically operated and a voltage setting value; an automatic voltage regulator, having a voltage setter, for outputting a command which is obtained by adding the correction signal to a voltage setting value provided by the voltage setter; and an exciter for carrying out the field control of the synchronous machine on the basis of the command issued from the automatic voltage regulator. Therefore, it is possible to obtain an HSVC function without exchanging an existing AVR.

In addition, since the above-mentioned module type HSVC apparatus includes an HMI (Human Machine Interface) for carrying out the setting of a reference voltage, and the setting and display of control logic, it is possible to carry out readily the confirmation and change of a setting value.

In addition, since the above-mentioned module type HSVC apparatus includes a connection unit having a communication function for connecting the HMI to a network, it is possible to carry out readily the confirmation and change of a setting value from a distant place.

In addition, since the above-mentioned module type HSVC apparatus has an input unit for inputting therethrough a voltage setting value from the above-mentioned automatic voltage regulator and outputs a correction signal based on a deviation between the inputted voltage setting value and the arithmetically operated high side voltage value, it is possible to obtain an HSVC function without exchanging an existing AVR.

Also, the above-mentioned synchronous machines which are connected in parallel with one another are connected to the transmission system through a transformer, the voltage detector, the current detector, the module type HSVC apparatus, the automatic voltage regulator, and the exciter are provided for each of the synchronous machines, and each of the module type HSVC apparatuses carries out the control for suppressing a cross current on the basis of an input of a reactive power from another module type HSVC apparatus. Therefore, it is possible to carry out the control with which the synchronous machines connected to in parallel with one another cooperate.

Moreover, since the above-mentioned module type HSVC apparatus includes an analog output unit for outputting therethrough the arithmetic operation result, it is possible to measure the arithmetic operation result from the outside.

While the present invention has been particularly shown and described with reference to the preferred embodiments, it will be understood that the various changes and modifications will occur to those skilled in the art without departing from the scope and true spirit of the invention. The scope of the invention is therefore to be determined solely by the appended claims.

What is claimed is:

1. An excitation controller for a synchronous machine comprising:

a voltage detector for detecting an output terminal voltage of a synchronous machine connected to a transmission system through a transformer;

a current detector for detecting current output by the synchronous machine;

modular HSVC (High Side Voltage Control) apparatus receiving the terminal voltage detected and the current detected, calculating reactive power produced by the synchronous machine based on the terminal voltage detected and the current detected, calculating a reactive current from the terminal voltage detected and the reactive power calculated, calculating a high side voltage from the reactive current calculated and reactance of the transformer, and outputting a correction signal based on deviation between the high side voltage calculated and a reference voltage;

an automatic voltage regulator receiving the correction signal, including a voltage setter, and outputting a command based on adding the correction signal to a voltage setting value provided by said voltage setter; and an exciter for field control of the synchronous machine based on the command issued from said automatic voltage regulator.

2. The excitation controller for a synchronous machine according to claim 1, wherein said module type HSVC apparatus includes an HMI (Human Machine Interface) for setting of the reference voltage, and setting and display of control logic.

3. The excitation controller for a synchronous machine according to claim 2, wherein said modular HSVC apparatus includes a connection unit having a communication function for connecting said HMI to a network.

4. The excitation controller for a synchronous machine according to claim 1, wherein said modular HSVC apparatus includes an input unit for inputting thereto the reference voltage and outputting the correction signal based on the deviation between the reference voltage input and the high side voltage calculated.

5. The excitation controller for a synchronous machine according to claim 1, wherein a plurality of synchronous machines are connected in parallel with one another to the transmission system through the transformer, a respective voltage detector, current detector, modular HSVC apparatus, automatic voltage regulator, and exciter are provided for each of the synchronous machines, and each of said modular HSVC apparatuses suppresses a cross current between the synchronous machines based on an input of reactive power from the other modular HSVC apparatus.

6. The excitation controller for a synchronous machine according to claim 1, wherein said modular HSVC apparatus includes an analog output unit for outputting a calculated result.

* * * * *